US010807551B2

(12) United States Patent
Deng et al.

(10) Patent No.: US 10,807,551 B2
(45) Date of Patent: Oct. 20, 2020

(54) VEHICLE SEAT WITH DEPLOYABLE PANEL

(71) Applicant: Ford Global Technologies, LLC, Dearborn, MI (US)

(72) Inventors: Zhibing Deng, Northville, MI (US); Krishnakanth E. Aekbote, Novi, MI (US); Joseph E. Abramczyk, Farmington Hills, MI (US); Deepak Patel, Canton, MI (US); Yun Cai, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 123 days.

(21) Appl. No.: 16/189,507

(22) Filed: Nov. 13, 2018

(65) Prior Publication Data

US 2020/0148149 A1   May 14, 2020

(51) Int. Cl.
*B60R 21/08* (2006.01)
*B60R 21/02* (2006.01)
*B60R 21/00* (2006.01)

(52) U.S. Cl.
CPC ...... *B60R 21/08* (2013.01); *B60R 2021/0009* (2013.01); *B60R 2021/0273* (2013.01)

(58) Field of Classification Search
CPC ....... B60R 21/06; B60R 21/08; B60R 21/207; B60R 21/23138; B60R 2021/0006; B60R 2021/0009; B60R 2021/0023; B60R 2021/022; B60R 2021/0273; B60R 2021/23146; B60R 2021/23161
See application file for complete search history.

(56) References Cited

U.S. PATENT DOCUMENTS

| | | | | |
|---|---|---|---|---|
| 4,592,523 A | * | 6/1986 | Herndon | B64D 25/02 244/122 AG |
| 6,029,993 A | * | 2/2000 | Mueller | B60R 21/23138 280/730.2 |
| 7,086,663 B2 | * | 8/2006 | Honda | B60R 21/207 280/730.2 |
| 8,899,619 B2 | | 12/2014 | Fukawatase | |
| 9,039,035 B1 | * | 5/2015 | Faruque | B60R 21/207 280/728.2 |
| 9,238,425 B2 | * | 1/2016 | Fukawatase | B60R 21/13 |
| 9,333,931 B1 | | 5/2016 | Cheng et al. | |
| 9,783,155 B2 | * | 10/2017 | Kondo | B60N 2/79 |
| 10,336,283 B2 | * | 7/2019 | Rickenbach | B60R 21/233 |
| 10,336,284 B2 | * | 7/2019 | Dry | B60R 21/2334 |

(Continued)

FOREIGN PATENT DOCUMENTS

DE      10258245 A1 *  6/2004   ....... B60R 21/23184
JP    2008-126857 A     6/2008

(Continued)

*Primary Examiner* — Laura Freedman
(74) *Attorney, Agent, or Firm* — Frank A. MacKenzie; Bejin Bieneman PLC

(57) ABSTRACT

A seat includes a seat bottom and a seatback. A seatbelt buckle is supported by the seat bottom. A restraint is deployable from the seatback to a deployed position and in the deployed position includes a first edge extending along the seatback, a second edge extending along the seat bottom, and a third edge extending from the first edge to the second edge. The restraint is disposed outboard of the seatbelt buckle relative to the seat bottom.

17 Claims, 8 Drawing Sheets

(56) References Cited

U.S. PATENT DOCUMENTS

| | | | | |
|---|---|---|---|---|
| 10,407,017 B2 * | 9/2019 | Markusic | ............... | B60R 21/233 |
| 10,471,920 B2 * | 11/2019 | Dry | ..................... | B60R 21/2165 |
| 10,518,733 B2 * | 12/2019 | Dry | ..................... | B60R 21/2338 |
| 10,525,926 B2 * | 1/2020 | Veggian | ................. | B60R 21/207 |
| 2006/0289220 A1 * | 12/2006 | Oota | ..................... | B60R 21/207 |
| | | | | 180/274 |
| 2017/0259774 A1 * | 9/2017 | Matsushita | ........ | B60R 21/23138 |
| 2019/0161050 A1 * | 5/2019 | Schneider | ............ | B60R 21/2338 |
| 2019/0291678 A1 * | 9/2019 | Cho | ........................ | B60R 21/207 |
| 2019/0299904 A1 * | 10/2019 | Nagasawa | .............. | B60R 21/207 |

FOREIGN PATENT DOCUMENTS

| | | | |
|---|---|---|---|
| JP | 5109517 B2 | | 10/2012 |
| JP | 2014180966 A | * | 9/2014 |
| JP | 5664585 B2 | | 12/2014 |
| JP | 5668675 B2 | | 12/2014 |

* cited by examiner

VEHICLE SEAT WITH DEPLOYABLE PANEL

BACKGROUND

During a vehicle impact, occupants may move in a direction influenced by the momentum of the vehicle. In a far side oblique impact, an occupant may contact a center console disposed inboard of the occupant relative to the vehicle. During the impact, the vehicle decelerates before the occupant decelerates. When the vehicle has decelerated but the occupant still has oblique momentum, the occupant leans and may slide obliquely inboard relative to a seat. This motion may bring the head of the occupant away from the seat, i.e., cause head excursion. Specifically, the head of the occupant may move away from the seat obliquely inboard relative to the seat.

DETAILED DESCRIPTION

Figure 1:
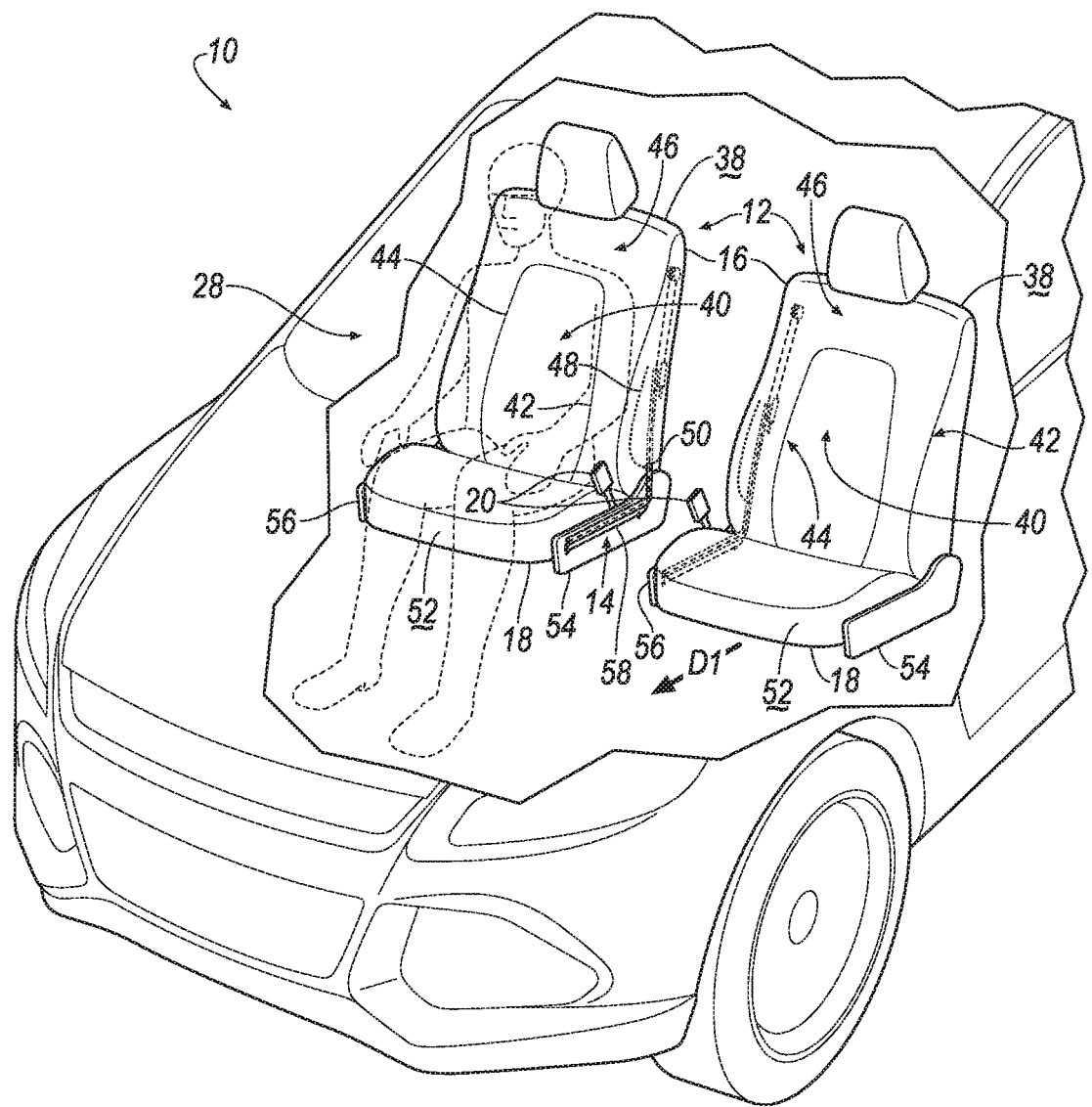
FIG. 1 is a perspective view of a vehicle including front seats having a restraint on one side.

A seat includes a seat bottom and a seatback. A seatbelt buckle is supported by the seat bottom. A restraint is deployable from the seatback to a deployed position and in the deployed position includes a first edge extending along the seatback, a second edge extending along the seat bottom, and a third edge extending from the first edge to the second edge. The restraint is disposed outboard of the seatbelt buckle relative to the seat bottom.

One of the first edge and the second edge may be fixed relative to one of the seatback and the seat bottom, respectively.

The restraint may include a cable deployable from the seatback to the deployed position. The cable in the deployed position may include a first portion extending along and fixed to one of the seatback and the seat bottom and a second portion extending transverse to the seatback and the seat bottom.

The restraint may include a panel extending along and fixed to the first portion and the second portion of the cable.

The panel may extend along the other of the seatback and the seat bottom.

A pulley may be rotatably supported by the other of the seatback and the seat bottom. The second portion of the cable may extend around the pulley.

The first edge of the restraint, in a undeployed position, may be disposed partially inside the seatback, and the second edge of the restraint may be disposed external to the seat bottom in an undeployed position.

A sleeve may cover the second portion of the cable. The sleeve may include an end disposed closer to the pulley in the deployed position than an undeployed position.

The first edge of the restraint, in an undeployed position, may be disposed partially inside the seatback. The second edge of the restraint may be disposed external to the seat bottom in the undeployed position.

A seat includes a seat bottom and a seatback. A restraint includes a cable deployable from the seatback to a deployed position. The cable includes a first portion extending along and fixed to one of the seatback and the seat bottom and a second portion extending from the first portion transverse to the seatback and the seat bottom. The restraint includes a panel extending along and fixed to the first and second portions.

A pulley may be rotatably supported by the other of the seatback and the seat bottom. The second portion of the cable may extend around the pulley.

A sleeve may cover the second portion of the cable. The sleeve may include an end disposed closer to the pulley in the deployed position as compared to an undeployed position.

The restraint may include a first edge extending along the seatback and a second edge extending along the seat bottom. The first edge may be partially disposed inside the seatback, and the second edge may be disposed external to the seat bottom in an undeployed position.

The seat may include a seatbelt buckle supported by the seat bottom. The restraint may be disposed outboard of the seatbelt buckle relative to the seat bottom.

The panel may extend along the other of the seatback and the seat bottom.

A seat includes a seat bottom and a seatback. A pulley is rotatably supported by one of the seatback and the seat bottom. A restraint includes a cable engaged with the pulley. The restraint is deployable from an undeployed position to a deployed position. The restraint includes a sleeve covering the cable and having an end. The end is disposed closer to the pulley in the deployed position as compared to the undeployed position.

The cable, in the deployed position, may include a first portion extending along and fixed to one of the seatback and the seat bottom and a second portion extending from the first portion transverse to the seatback and the seat bottom.

The restraint may include a panel extending along and fixed to the first portion and the second portion.

The panel may extend along the other of the seatback and the seat bottom.

A seatbelt buckle may be supported by the seat bottom. The restraint may be disposed outboard of the seatbelt buckle relative to the seat bottom.

The restraint may include a first edge extending along the seatback and a second edge extending along the seat bottom. The first edge may be partially disposed inside the seatback, and the second edge may be disposed external to the seat bottom in an undeployed position.

Figure 3A:
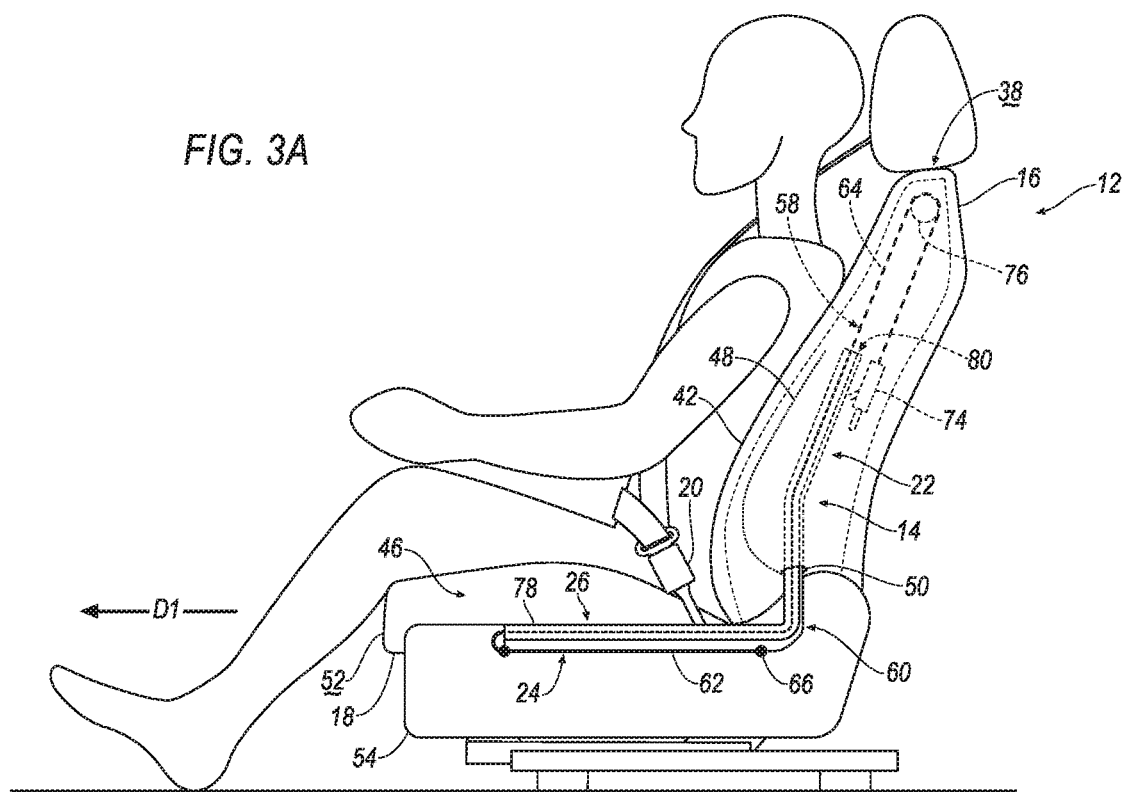
FIG. 3A is a side view of one embodiment of the restraint in the undeployed position.
Figure 3B:
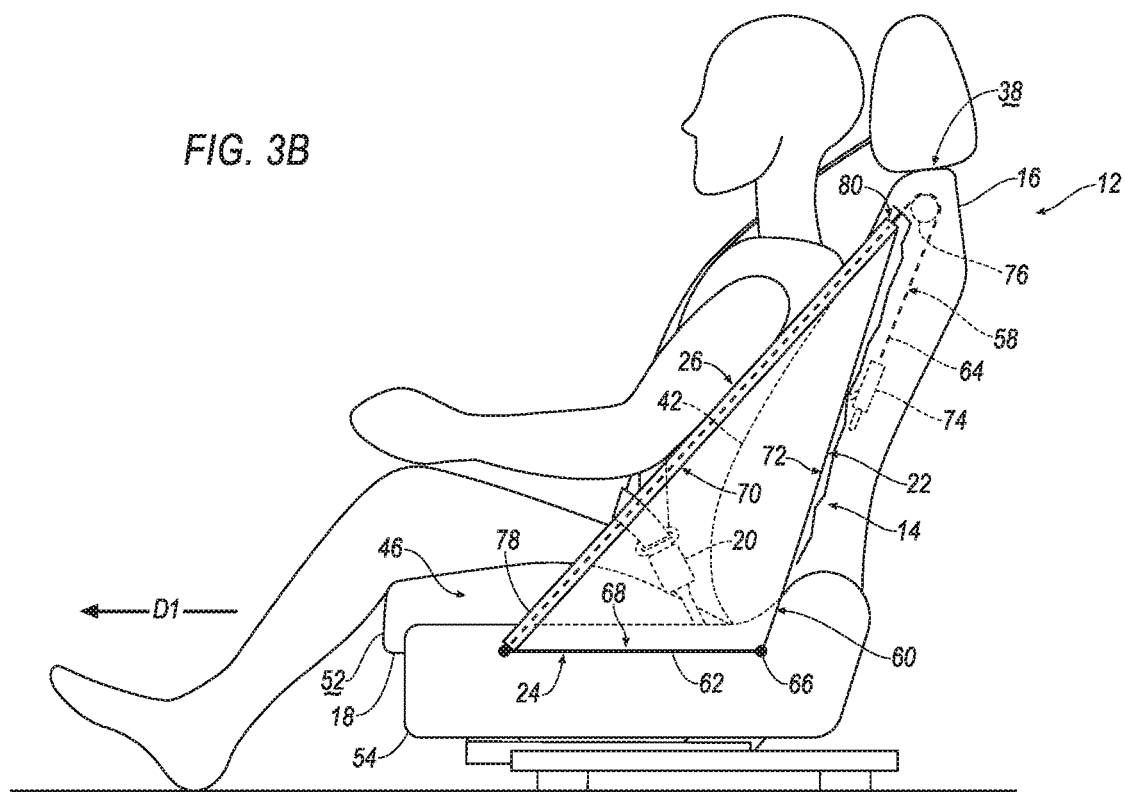
FIG. 3B is a side view of one embodiment of the restraint in the deployed position.
Figure 4A:
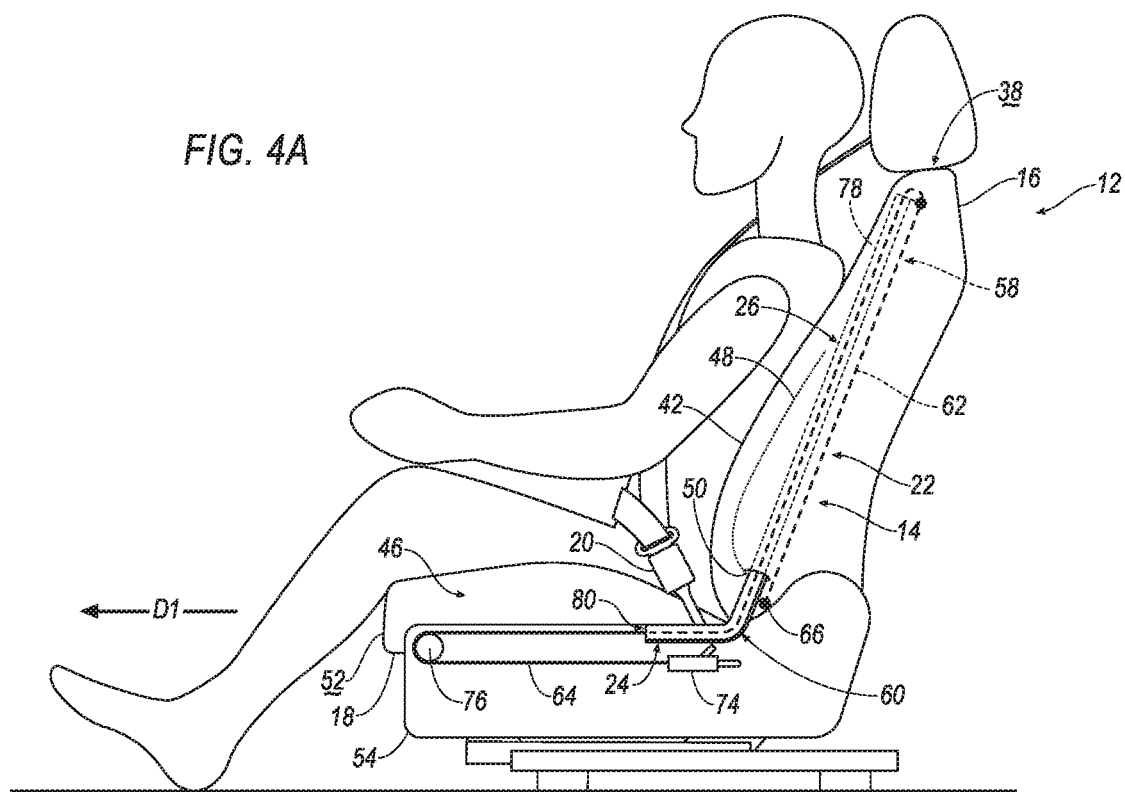
FIG. 4A a side view of another embodiment of the restraint in the undeployed position.
Figure 4B:
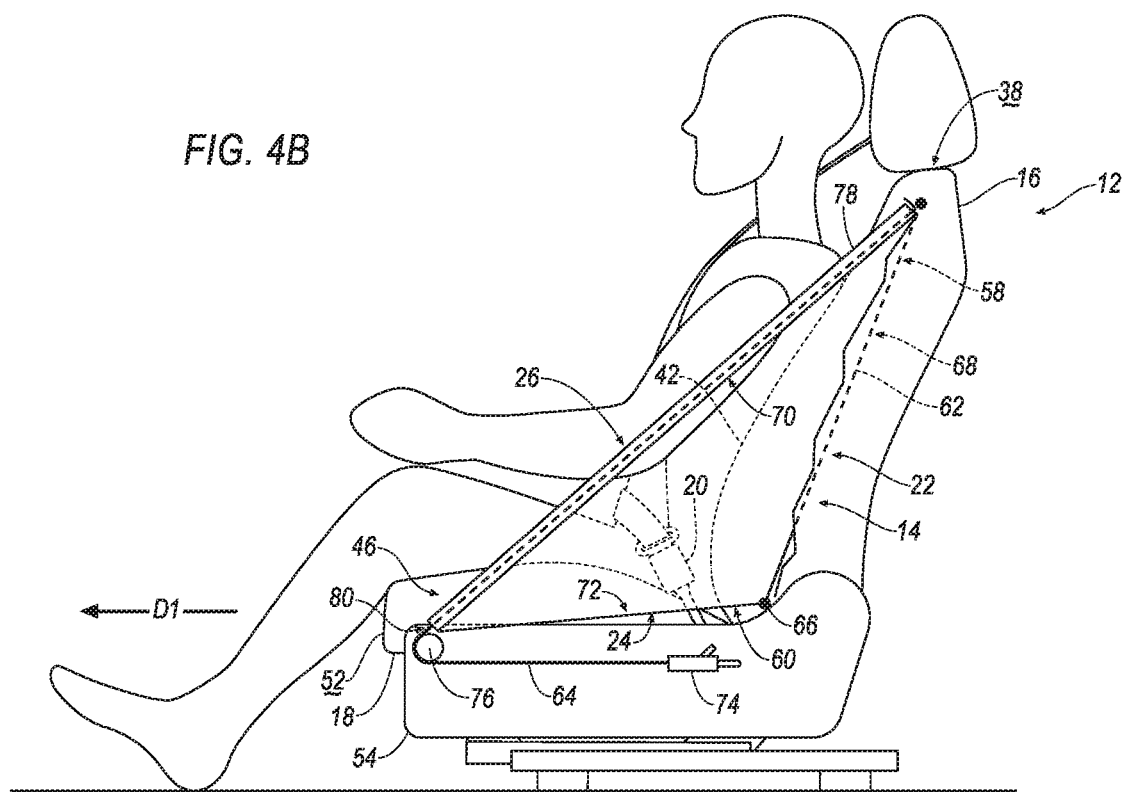
FIG. 4B a side view of another embodiment of the restraint in the deployed position.

With reference to the Figures, wherein like numerals indicate like parts throughout the several views, a vehicle 10 is generally shown. The vehicle 10 includes a seat 12 having a restraint 14. During a vehicle impact, the restraint 14 may be deployable from an undeployed position, as shown in FIGS. 1-3A, and 4A, to a deployed position as shown in FIGS. 3B and 4B. During the vehicle impact, e.g., a far side oblique impact, an occupant may be forced into the restraint 14 in the deployed position. During the far side oblique impact, the restraint 14 may provide coverage so as to absorb energy of the occupant, e.g., a torso and upper leg of the occupant. During these types of impacts, the restraint 14 may assist in retaining the occupant in the seat 12.

Specifically, the seat 12 includes a seatback 16, a seat bottom 18, and a seatbelt buckle 20 supported by the seat bottom 18. The restraint 14 is deployable from the seatback 16 to the deployed position. The restraint 14 includes a first edge 22 extending along the seatback 16, a second edge 24 extending along the seat bottom 18, and a third edge 26 extending from the first edge 22 to the second edge 24. The restraint 14 is disposed outboard of the seatbelt buckle 20 relative to the seat bottom 18. As the restraint 14 deploys from the undeployed position to the deployed position, the third edge 26 of the restraint 14 is pulled out of the seatback 16, e.g., toward a front of the vehicle 10, and one of the first edge 22 and the second edge 24 moves along the seat 12, e.g., the seatback 16 and seat bottom 18, respectively. The restraint 14 may slow or stop the occupant, e.g., the torso and upper leg, from moving obliquely off the seat 12. By retaining the occupant on the seat 12, the restraint 14 absorbs energy from the occupant of the seat 12 and may assist in preventing the occupant of the seat 12 from impacting other occupants or vehicle components during the far side oblique impact, which may which may reduce head inboard excursion of the occupant.

With reference to FIG. 1, the vehicle 10 may, for example, be any suitable type of automobile. The vehicle 10 includes a passenger cabin 28 to house occupants, if any, of the vehicle 10. The passenger cabin 28 includes one or more seats 12, e.g., any suitable number of seats. The seats 12 may be disposed at any suitable position in the passenger cabin 28. For example, the seats 12 may be front seats disposed at a front of the passenger cabin 28. As another example, the seats 12 may be rear seats spaced from the front seats. The rear seats may be, for example, disposed behind the front seats in the passenger cabin 28. The passenger cabin 28 may also include third-row seats (not shown) at a rear of the passenger cabin 28, in which case the front seats may be second-row seats (not numbered) instead of or in addition to being front seats. The front seats and the rear seats may be a same or different type of seat. The front seats and rear seats may be any suitable type of seats, e.g., bucket seats, bench seats, etc.

The seats 12, i.e., the front seats and the rear seats, may include the seatback 16, the seat bottom 18, and a head restraint (not numbered). The head restraint may be supported on the seatback 16 and may be stationary or movable relative to the seatback 16. The seatback 16 may be supported on the seat bottom 18 and may extend upwardly from the seat bottom 18 as set forth further below. The seatback 16 may be stationary or movable relative to the seat bottom 18. For example, the seatback 16 may be pivotable about the seat bottom 18, as set forth further below. The seatback 16, the seat bottom 18, and/or the head restraint may be adjustable in multiple degrees of freedom. Specifically, the seatback 16, the seat bottom 18, and/or the head restraint may themselves be adjustable, in other words, may have adjustable components within themselves, and/or may be adjustable relative to each other.

Figure 2:
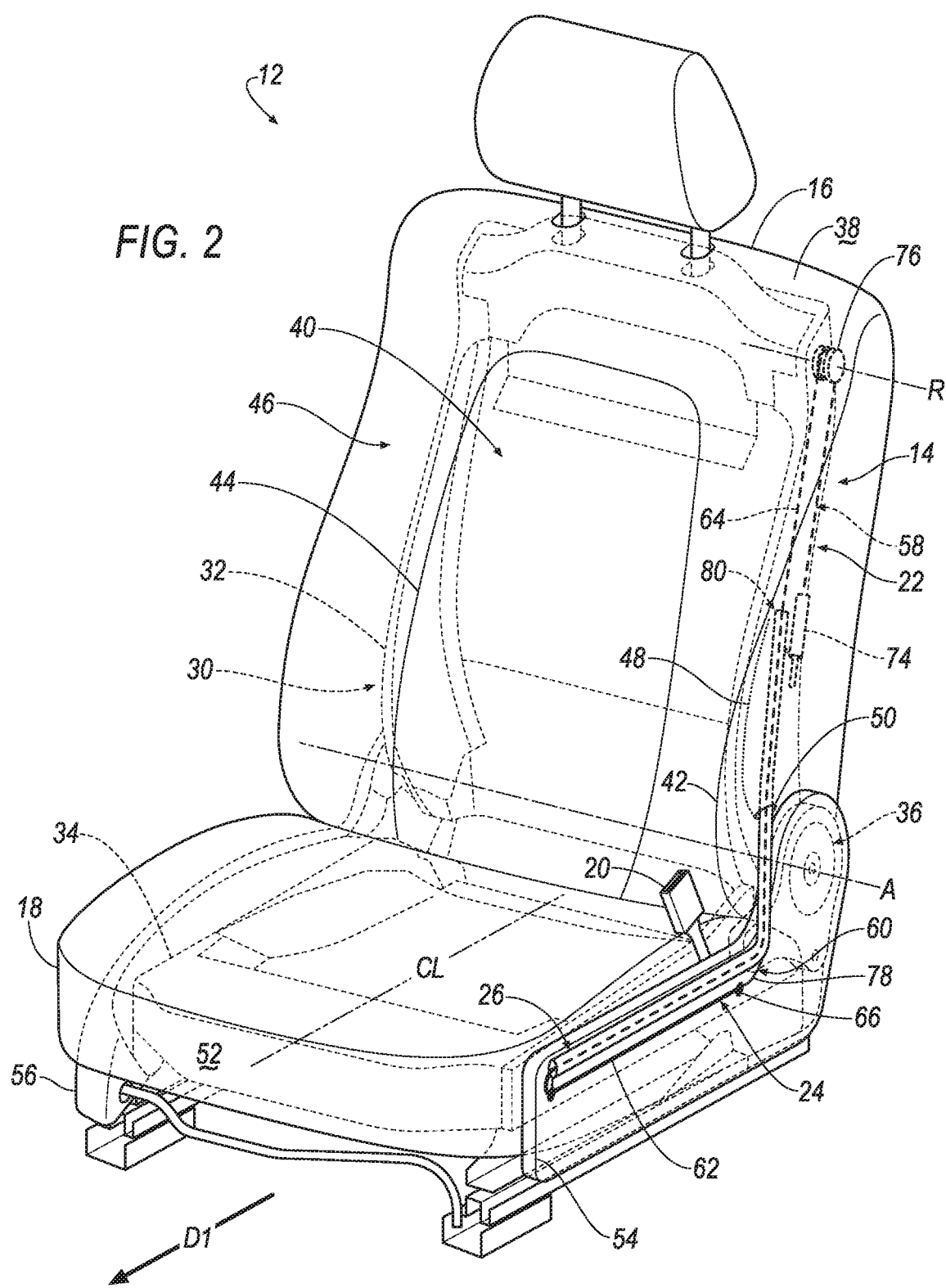
FIG. 2 is a perspective view of a passenger seat including the restraint in an undeployed position.

With reference to FIG. 2, the seat 12 includes a seat frame 30. The seat frame 30 includes the seatback frame 32 and a seat bottom frame 34. A hinge 36 couples the seat bottom frame 34 and the seatback frame 32 together. The hinge 36 permits the seatback frame 32 to pivot relative to the seat bottom frame 34 about an axis A. The seat frame 30 may include panels and/or may include tubes, beams, etc.

The seat frame 30 may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

With continued reference to FIG. 2, the seat 12 includes a covering 46 supported on the seat frame 30. The covering 46 may be cloth, leather, faux leather, or any other suitable material. The seat 12 may include padding material between the covering 46 and the seat frame 30. The padding material may be foam or any other suitable material. The cover may be stitched in panels around the seat frame 30 and padding material.

With continued reference to FIG. 2, the seat 12 may define a seat-forward direction D1. The seat-forward direction D1 extends forward relative to the seat 12. For example, the seat-forward direction D1 may extend from a rear of the seat 12 to a front of the seat 12 relative to an occupant of the seat 12. As another example, the seat bottom 18 may extend from the seatback 16 in the seat-forward direction D1.

With continued reference to FIG. 2, the seat bottom 18 may include a front surface 52 spaced from the seatback 16. The seat bottom 18 may extend from the hinge 36 to the front surface 52. For example, the seat bottom 18 may include plates 54, 56 extending from the hinge 36 to the front surface 52. The plates 54, 56 may be spaced from each other along the axis A. The plates 54, 56 may be fixed to the seat bottom frame 34, e.g., by fasteners, welding, etc. The plates 54, 56 may, for example, cover the seat bottom frame 34. The plates 54, 56 define the left and right boundaries of the seat bottom 18 along the axis A relative to an occupant of the seat 12. Said differently, the seat bottom 18 includes a left side 54 and a right side 56 relative to an occupant of the seat 12. The plates 54, 56 may be formed of any suitable material, e.g., plastic.

With continued reference to FIG. 2, the seat bottom 18 may define a centerline CL. The centerline CL may extend between the front and the rear of the seat 12 and bisect the seat bottom 18. For example, the centerline CL may extend from the seatback 16 in the seat-forward direction D1 and be midway between the left side 54 and the right side 56 of the seat 12.

With continued reference to FIG. 2, the seatback 16 extends upwardly from the seat bottom 18. For example, the seatback 16 includes a top surface 38 spaced from the seat bottom 18. The seatback 16 extends from the hinge 36 to the top surface 38.

With continued reference to FIG. 2, the seatback 16 includes a bolster 42, 44 and a backrest 40 adjacent to the bolster 42, 44. Specifically, the seatback 16 includes two bolsters 42, 44 and the backrest 40 extends from one of the bolsters 42 to the other of the bolsters 44. The backrest 40 and the bolsters 42, 44 are supported by the seatback frame 32. The seatback 16 may terminate at the bolsters 42, 44 along the axis A. In other words, the bolsters 42, 44 define left and right boundaries of the seatback 16 relative to an occupant of the seat 12. Said differently, the seatback 16 includes a left bolster 42 and a right bolster 44. The backrest 40 extends between the bolsters 42, 44 to support the back of an occupant seated on the seat 12. The bolsters 42, 44 protrude forward from the backrest 40 such that the bolsters 42, 44 extend along the sides of the occupant when the back of the occupant rests on the backrest 40. The bolsters 42, 44 may extend along the backrest 40 upwardly from the seat bottom 18. The bolsters 42, 44 may, for example, extend from the hinge 36 to the top surface 38 of the seatback 16. The bolsters 42, 44 may be formed by the padding material and the covering 46.

With reference to FIGS. 1-3A and 4A, the seatback 16, e.g., the covering 46, may include a tear seam 48. The tear seam 48 may be disposed on at least one of the bolsters 42, 44. For example, the tear seam 48 may be disposed adjacent to the restraint 14. As shown in FIGS. 2-4B, the tear seam 48 may be disposed on the left bolster 42. The tear seam 48 may be elongated along the at least one bolster 42, 44.

The tear seam 48 may be designed to tear apart when subjected to a tensile force above a threshold magnitude. In other words, the cover on one side of the tear seam 48 separates from the covering 46 on the other side of the tear seam 48 when the force is above the threshold magnitude. The threshold magnitude may be chosen to be greater than forces from, e.g., inadvertent pushing against the seatback 16 by an occupant but be less than forces from the deployment of the restraint 14. The tear seam 48 may be, for example, a line of perforations through the covering 46, a line of thinner covering material than the rest of the covering 46, etc.

The covering 46 may include an opening 50 disposed adjacent to the hinge 36, i.e., the seat bottom 18, as shown in FIGS. 1-3A and 4A. The opening 50 may extend through the covering 46. The opening 50 may have any suitable shape. For example, the opening 50 may be a hole in the covering 46, i.e., have a circular shape. As another example, the opening 50 may be a slit in the covering 46, i.e., have a rectangular shape. The opening 50 may be disposed between the tear seam 48 and the seat bottom 18. For example, the opening 50 may abut an end of the tear seam 48.

The seatbelt buckle 20 is supported by the seat bottom 18. For example, the seatbelt buckle 20 may be fixed to the seat bottom 18. Specifically, the seatbelt buckle 20 may be fixed to the left side 54 of the seat bottom 18, as shown in the Figures. The left side 54 of the seat bottom 18 may, for example, be disposed between the seatbelt buckle 20 and the right side 56 of the seat bottom 18. In other words, the seatbelt buckle 20 may be disposed external to the cushion. Alternatively, the seatbelt buckle 20 may be disposed between the plates 54, 56 of the seat bottom 18. In this situation, the seatbelt buckle 20 may extend through the cushion.

The seatbelt buckle 20 may be disposed in any suitable position relative to the seat bottom 18, e.g., the cushion. For example, the seatbelt buckle 20 may be disposed below the cushion. In other words, the seatbelt buckle 20 may be disposed between the cushion and a floor of the vehicle 10. Alternatively, the seatbelt buckle 20 may extend partially above the seat bottom 18, as shown in the Figures. In other words, the seat bottom 18 may be disposed between a portion of the seatbelt buckle 20 and the floor of the vehicle 10.

With reference to FIGS. 2-4B, the seat 12 may include a pretensioner 74 fixed to one of the seatback frame 32 and the seat bottom frame 34 for applying tension to the restraint 14 during the vehicle impact. Upon a sensed vehicle impact, the pretensioner 74 may be actuated to retract the restraint 14 to remove slack from the restraint 14 and to pull the restraint 14 out of the seatback 16 into the deployed position. The pretensioner 74 may be fixed to one of the seatback frame 32 and the seat bottom frame 34 in any suitable manner, e.g., fasteners.

The pretensioner 74 may be of any suitable type such as a piston linkage, in which an explosive charge drives a piston attached to a cable; a ball-in-tube linkage, in which an explosive charge propels a ball or balls over a cogwheel connected to a cable; a mechanical linkage, in which a compressed spring attached to a cable is released; a rack and pinion linkage, in which an explosive charge propels a toothed rack bar to mesh with a gear connected to a cable, or any other suitable type.

With reference to FIGS. 2-4B, the seat 12 may include a pulley 76 rotationally supported by to one of the seatback frame 32 and the seat bottom frame 34. The pulley 76 and the pretensioner 74 are each supported by the same one of the seatback frame 32 and the seat bottom frame 34. For example, the pulley 76 and the pretensioner 74 may each be supported on the seatback 16, as shown in FIGS. 3A and 3B. Alternatively, the pulley 76 and the pretensioner 74 may each be supported on the seat bottom 18 as shown in FIGS. 4A and 4B. The pulley 76 may be spaced from the pretensioner 74 along the one of the seatback frame 32 and the seat bottom frame 34. For example, the pretensioner 74 may be disposed between the pulley 76 and the hinge 36 on one of the seatback 16 and the seat bottom 18. The pulley 76 may define an axis of rotation R about which the pulley 76 rotates, as shown in FIG. 2. The axis of rotation R may extend along the axis A, i.e., in the cross-vehicle direction.

The vehicle 10 may include any suitable number of restraints 14. In other words, one or more of the seats 12 may include at least one restraint 14. For example, each seat 12 may include one restraint 14. As another example, the front seats may each include one restraint 14. As yet another example, the front seats may each include two restraints 14.

Figure 6:
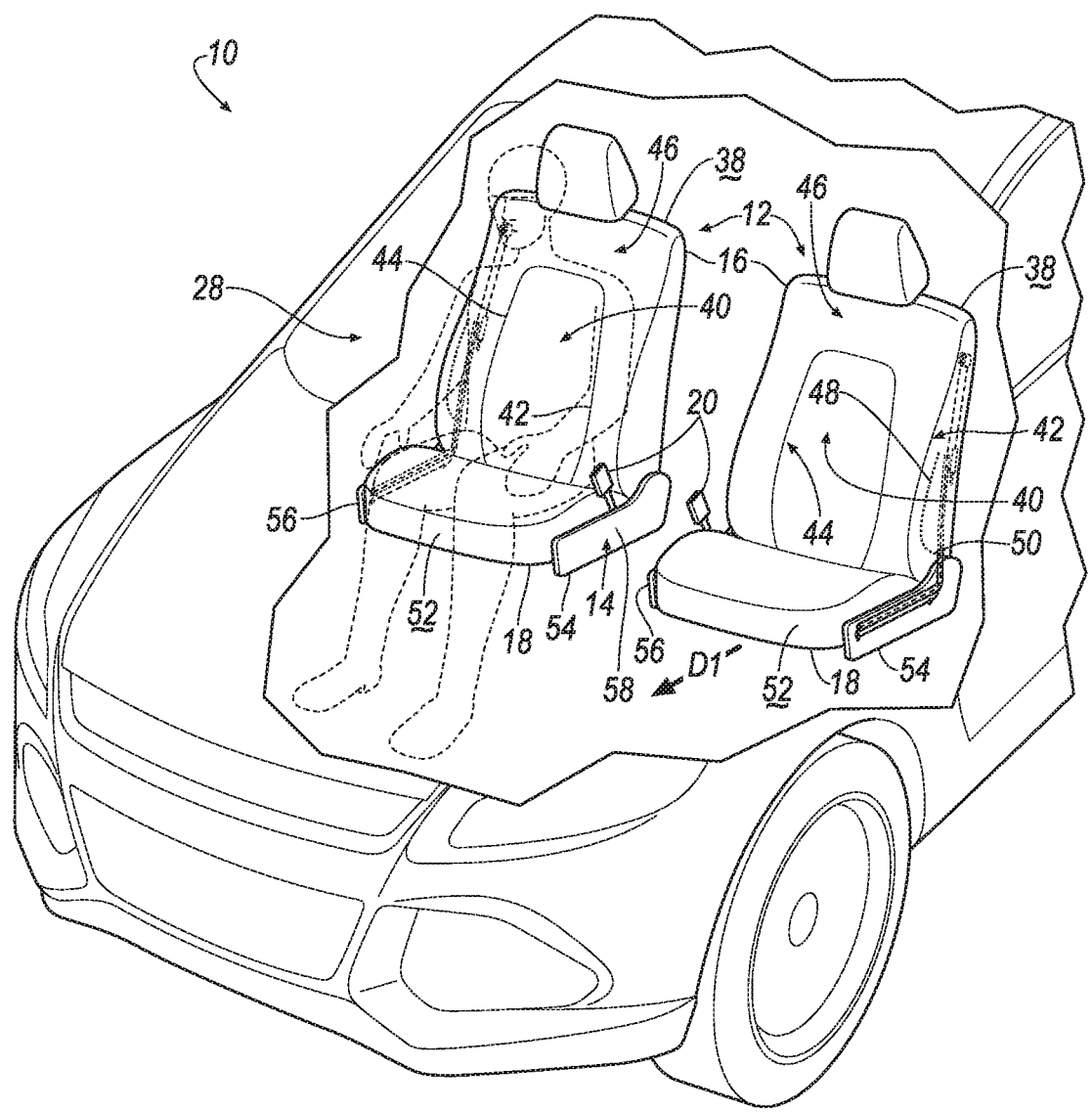
FIG. 6 is a perspective view of the vehicle including front seats having a restraint on the other side.

The restraint 14 may be disposed on at least one of the left side or the right side of the seat 12. For example, the restraint 14 may be disposed between the seat 12 and a vehicle component, e.g., a center console, another seat 12, etc., as shown in FIG. 1. In this situation, one restraint 14 is disposed on the left side of the driver seat and one restraint 14 is disposed on the right side of the passenger seat. As another example, the restraint 14 may be disposed between the seat 12 and a vehicle body, e.g., a B-pillar, a door, etc., as shown in FIG. 6. In this situation, one restraint 14 is disposed on the right side of the driver seat and one restraint 14 is disposed on the left side of the passenger seat. As yet another example, one restraint 14 may be disposed on each side of the seat 12.

In the undeployed position, the restraint 14 may be loose relative to the seatback 16 and the seat bottom 18 and may be routed along the seatback 16 and the seat bottom 18. In other words, the restraint 14 may be substantially "L-shaped" in the undeployed position, as shown in FIGS. 1-3A, 4A, and FIG. 6. In the deployed position, the restraint 14 is in tension between the seatback 16 and the seat bottom 18. The restraint 14 has a triangular shape in the deployed position, as shown in FIGS. 3B and 4B.

With reference to FIGS. 1-3A, 4A, and FIG. 6, the restraint 14 may be partially disposed in the seatback 16 in the undeployed position. For example, the restraint 14, e.g., the first edge 22 and the third edge 26, may be partially disposed in the left bolster 42, e.g., adjacent to the tear seam 48. The restraint 14, e.g., the first edge 22 and the third edge 26, may extend through opening 50 of the covering 46 of the seatback 16 toward the seat bottom 18. In other words, the first edge 22 and the third edge 26 are external to the seatback 16 from the opening 50 to the second edge 24 of the restraint 14. Additionally, the restraint 14, e.g., the second edge 24, extends along the seat bottom 18 and is disposed external to the seat bottom 18 in both the undeployed position and the deployed position.

The restraint 14 may be disposed outboard of the seatbelt buckle 20 relative to the seat 12, e.g., the seat bottom 18. In other words, the restraint 14 may be spaced farther from the centerline CL of the seat bottom 18, e.g., along the axis A, than the seatbelt buckle 20. Said differently, the seatbelt buckle 20 is disposed closer to the centerline CL of the seat bottom 18 than the restraint 14. The seatbelt buckle 20 may, for example, be disposed between the restraint 14 and the centerline CL of the seat bottom 18, as shown in FIG. 2. In other words, the seatbelt buckle 20 may be disposed between the restraint 14 and the occupant of the seat 12, as shown in FIG. 1. Said differently, the seatbelt buckle 20 may be disposed between the restraint 14 and the right side 56 of the seat bottom 18. Alternatively, the right side 56 of the seat bottom 18 may be disposed between the seatbelt buckle 20 and the restraint 14, as shown in FIG. 6. In other words, the centerline CL may be disposed between the seatbelt buckle 20 and the restraint 14.

One of the first edge 22 and the second edge 24 of the restraint 14 may be fixed relative to one of the seatback 16 and the seat bottom 18, respectively. In other words, one of the first edge 22 and the second edge 24 does not move relative to one of the seatback 16 and the seat bottom 18, respectively. For example, the first edge 22 of the restraint 14 may be fixed relative to the seatback 16, as shown in FIG. 4A. In this situation, the first edge 22 of the restraint 14 may remain taut, e.g., along the seatback 16, during deployment of the restraint 14 from the undeployed position to the deployed position. As another example, the second edge 24 of the restraint 14 may be fixed relative to the seat bottom 18, as shown in FIG. 3A. In this situation, the second edge 24 of the restraint 14 may remain taut, e.g., along the seat bottom 18, during deployment of the restraint 14 from the undeployed position to the deployed position.

Additionally, the other of the first edge 22 and the second edge 24 may be moveable relative to the other of the seatback 16 and the seat bottom 18, respectively. For example, the second edge 24 of the restraint 14 may move relative to the seat bottom 18 during deployment of the restraint 14, as shown in FIGS. 4A and 4B. As another example, the first edge 22 of the restraint 14 may move relative to the seatback 16 during deployment of the restraint 14, as shown in FIGS. 3A and 3B.

With reference to FIGS. 2-4B, the restraint 14 includes a cable 58. The cable 58 may be formed of, for example, steel wires or any other suitable material and structure. The cable 58 includes a first portion 62 and a second portion 64 extending from the first portion 62. The first portion 62 extends along one of the seatback 16 and the seat bottom 18.

With continued reference to FIGS. 2-4B, the first portion 62 may include an end 66 disposed proximate to the hinge 36. For example, the end 66 may be disposed between the hinge 36 and one of the front surface 52 of the seat bottom and the top surface 38 of the seatback 16. The first portion 62 may extend from the end 66 away from the hinge 36 along one of the seatback 16 and the seat bottom 18. Specifically, the first portion 62 may extend from the end 66 along one of the seatback 16 and the seat bottom 18 to the second portion 64. The first portion 62 is taut when the restraint 14 is both in the undeployed position and the deployed position.

The first portion 62 may be fixed to one of the seatback 16 and the seat bottom 18. For example, the first portion 62 may be fixed entirely from the end 66 to the second portion 64 to one of the seatback 16 and the seat bottom 18. As another example, the first portion 62 may be fixed at multiple locations to one of the seatback 16 and the seat bottom 18. The first portion 62 may be fixed to one of the seatback 16 and the seat bottom 18 by any suitable means, e.g., stitching, fasteners, etc.

With reference to FIGS. 2-4B, the second portion 64 extends transverse from the first portion 62 to the other of the seatback 16 and the seat bottom 18. For example, the second portion 64 extends transverse to the seatback 16 and the seat bottom 18 when the restraint 14 is in the deployed position. In other words, the second portion 64 extends from the seatback 16 to the seat bottom 18, e.g., transverse to the seat-forward direction D1. The second portion 64 of the cable 58 is engaged with the pretensioner 74. In other words, the second portion 64 of the cable 58 is retracted into the pretensioner 74 when the pretensioner 74 is actuated. In this situation, the second portion 64 of the cable 58 is pulled out of the seatback 16, e.g., through the tear seam 48 of the left bolster 42.

Additionally, the second portion 64 of the cable 58 is engaged with the pulley 76. The pulley 76 may guide the second portion 64 of the cable 58 between the pretensioner 74 and the other of the seatback frame 32 and the seat bottom frame 34. In other words, the second portion 64 extends around, i.e., is engaged with, the pulley 76.

The restraint 14 includes a panel 60 fixed to the cable 58. For example, the panel 60 is fixed to the first portion 62 of the cable 58 and the second portion 64 of the cable 58. The panel 60 extends from the second portion 64 of the cable 58 to each of the seatback 16 and the seat bottom 18, as shown in FIGS. 3B and 4B. Said differently, the restraint 14 is a sail.

The panel 60 may be uninflatable. In other words, the panel 60 may not define an inflation chamber, e.g., the panel 60 may be a panel of material that is not fixed to another panel, or itself, to enclose a volume for receiving inflation medium. The panel 60 may be a woven fabric, or any other suitable material.

With reference to FIGS. 3B and 4B, the panel 60 includes a first side 68 extending along the first portion 62 of the cable 58, i.e., one of the seatback 16 and the seat bottom 18. The first side 68 is fixed to the first portion 62 of the cable 58. In this situation, the first side 68 of the panel 60 and the first portion 62 of the cable 58 may define one of the first edge 22 and the second edge 24 of the restraint 14. Additionally, the first side 68 of the panel 60 may be fixed to one of the seatback 16 and the seat bottom 18. In other words, the first portion 62 of the cable 58, the first side 68 of the panel 60, and one of the seatback 16 and the seat bottom 18 may be fixed to each other.

With reference to FIGS. 3B and 4B, the panel 60 includes a second side 70 extending along the second portion 64 of the cable 58. In other words, the second side 70 extends transverse to the first side 68 and transverse to the seatback 16 and the seat bottom 18. The second side 70 is fixed to the second portion 64 of the cable 58. The panel 60, e.g., the first side 68 and the second side 70, may be fixed to the cable 58, e.g., the first portion 62 and the second portion 64, respectively, in any suitable manner, e.g., stitching, ultrasonic welding, fasteners, etc.

With reference to FIGS. 3B and 4B, the panel 60 includes a third side 72 extending from the first side 68 to the second side 70. The third side 72 extends transverse to both the first side 68 and the second side 70. For example, the third side 72 may extend along the other of the seatback 16 and the seat bottom 18. The third side 72 of the panel 60 defines the other of the first edge 22 and the second edge 24 of the restraint 14. The third side 72 of the panel 60 is moveable relative to the other of the seatback 16 and the seat bottom 18. For example, the third side 72 may move along the other of the seatback 16 and the seat bottom 18 during deployment of the restraint 14 from the undeployed position to the deployed position. In the deployed position, the panel 60 extends between the cable 58, the seatback 16, and the seat bottom 18. The panel 60 may be formed of any suitable material, e.g., polyester, nylon, etc.

With reference to FIGS. 2-4B, the restraint includes a sleeve 78 extending along the second portion 64 of the cable 58 from the first portion 62 of the cable 58 to an end 80. The end 80 of the sleeve 78 may be disposed at the transition between the second side 70 and the third side 72 of the panel 60. The sleeve 78 covers the second portion 64 of the cable 58, i.e., extends around the second portion 64 of the cable 58. The sleeve 78 is fixed to the second portion 64 of the cable 58 from the first portion 62 of the cable 58 to the end 80 of the sleeve 78. The sleeve 78 is fixed to the second portion 64 of the cable 58 in any suitable manner, e.g., stitching, welding, etc.

The end 80 of the sleeve 78 moves relative to the seat 12 during deployment of the restraint 14 from the undeployed position to the deployed position. For example, the end 80 of the sleeve 78 is pulled toward the pulley 76 when the cable 58 is deployed, i.e., when the pretensioner 74 is actuated. In other words, the end 80 of the sleeve 78 is closer to the pulley 76 in the deployed position as compared to the undeployed position.

Additionally, the sleeve 78 may be fixed to the second side 70 of the panel 60. For example, the second portion 64 of the cable 58, the sleeve 78, and second side 70 of the panel 60 may be fixed together. In other words, the second portion 64 of the cable 58, the sleeve 78 and the second side 70 of the panel 60 may define the third edge 26 of the restraint 14. The sleeve 78 may be fixed to the panel 60 and the cable 58 by any suitable means, e.g., stitching, ultrasonic welding, fasteners, etc. The sleeve 78 may be a woven material, or any other suitable material, e.g., polyester, nylon, etc. For example, the sleeve 78 and the panel 60 may be a same type of material.

The restraint 14 is fixed to one of the seat bottom 18 and the seatback 16. One embodiment of the system is shown in FIGS. 3A and 3B, and another embodiment of the system is shown in FIGS. 4A and 4B. In the embodiment shown in FIGS. 3A and 3B, the restraint 14, e.g., the second edge 24, is fixed to the seat bottom 18. In the embodiment shown in FIGS. 4A and 4B, the restraint 14, e.g., the first edge 22, is fixed to the seatback 16. Common numerals are used to identify common features in the two embodiments.

In the embodiment shown in FIGS. 3A and 3B, the first portion 62 of the cable 58 extends from the end 66 along seat bottom 18 towards the front surface 52 of the seat bottom 18, e.g., in the seat-forward direction D1. Additionally, the first portion 62 of the cable 58 is fixed to the seat bottom 18. The pulley 76 is disposed adjacent to the top surface 38 of the seatback 16, and the pretensioner 74 is spaced from the pulley 76 along the seatback 16, e.g., toward the hinge 36. In the undeployed position, the second portion 64 extends from the end 66 of the first portion 62 along the seat bottom 18, e.g., toward the hinge 36, and along the seatback 16, e.g., toward the pulley 76. The third side 72 of the panel 60 extends along and is moveable relative to the seatback 16. During deployment, the pretensioner 74 retracts the second portion 64 and pulls the cable 58 around the pulley 76. The second portion 64 of the cable 58 breaks through the tear seam 48 pulling the second side 70 of the panel 60 to the deployed position. Additionally, the end 80 of the sleeve 78 moves towards the pulley 76, which pulls the third side 72 of the panel 60 along the seatback 16 toward the pulley 76, i.e., the top surface 38 of the seatback 16. The first portion 62 of the cable 58 and the first side 68 of the panel 60 remain fixed to the seat bottom 18 during deployment. In this embodiment, the first portion 62 of the cable and the first side 68 of the panel define the second edge 24 of the restraint, and the third side 72 of the panel 60 defines the first edge 22 of the restraint 14.

In the embodiment shown in FIGS. 4A and 4B, the first portion 62 of the cable 58 extends from the end 66 along seatback 16 towards the top surface 38 of the seatback 16. Additionally, the first portion 62 is fixed to the seatback 16. The pulley 76 is disposed adjacent to the front surface 52 of the seat bottom 18, and the pretensioner 74 is spaced from the pulley 76 along the seat bottom 18, e.g., toward the hinge 36. In the undeployed position, the second portion 64 extends from the end 66 of the first portion 62 along the seatback 16, e.g., toward the hinge 36, and along the seat bottom 18, e.g., toward the pulley 76. The third side 72 of the panel 60 extends along and is moveable relative to the seat bottom 18. During deployment, the pretensioner 74 retracts the second portion 64 and pulls the cable 58 around the pulley 76. The second portion 64 of the cable 58 breaks through the tear seam 48 pulling the second side 70 of the panel 60 to the deployed position. Additionally, the end 80 of the sleeve 78 moves towards the pulley 76, which pulls the third side 72 of the panel 60 along the seat bottom 18 toward the pulley 76, i.e., the front surface 52 of the seat bottom 18. The first portion 62 of the cable 58 and the first side 68 of the panel 60 remain fixed to the seatback 16 during deployment. In this embodiment, the first portion 62 of the cable and the first side 68 of the panel define the first edge 22 of the restraint, and the third side 72 of the panel 60 defines the second edge 24 of the restraint 14.

Figure 5:
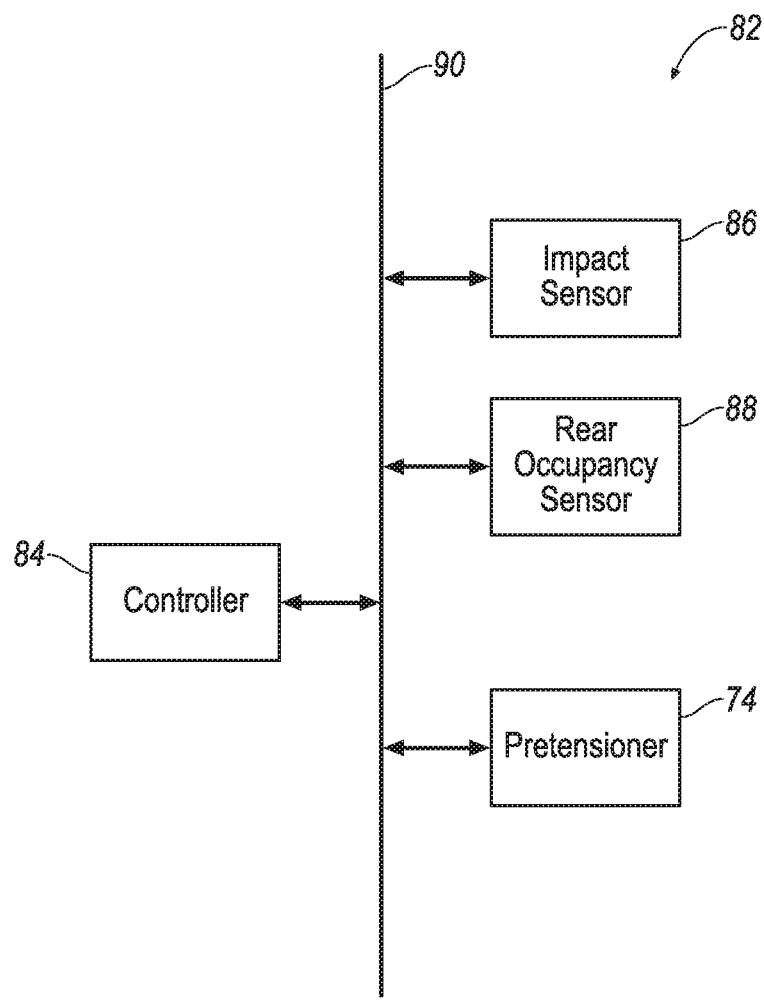
FIG. 5 is a block diagram of a control system for the system.

As shown in FIG. 5, a control system 82 may include the pretensioner 74, a controller 84, an impact sensor 86, and an occupancy sensor 88, in communication through a communications network 90.

The impact sensor 86 may be in communication with the controller 84. The impact sensor 86 is programmed to detect an impact to the vehicle 10. The impact sensor 86 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 86 may be located at numerous points in or on the vehicle 10.

The control system 82 includes the occupancy sensor 88 for the seat 12. The occupancy sensor 88 may be configured to detect occupancy of the seat 12. The occupancy sensor 88 may be visible-light or infrared cameras directed at the seat 12, weight sensors inside the seat 12, sensors detecting whether a seatbelt (not shown) for the seat 12 is buckled or unspooled, or other suitable sensors. The occupancy sensor 88 is in communication with the controller 84 via the communications network 90.

The controller 84 may be a microprocessor-based controller. The controller 84 may include a processor, memory, etc. The memory of the controller 84 may store instructions executable by the processor.

The control system 82 may transmit signals through a communications network 90 such as a controller area network (CAN) bus, Ethernet, Local Interconnect Network (LIN), and/or by any other wired or wireless communications network 90.

The controller 84 may be programmed to instruct the pretensioner 74 to actuate in response to a far side oblique collision. Specifically, the controller 84 may be programmed to receive a notification of a far side oblique collision from the impact sensor 86, receive a notification that the seat 12 is occupied, and instruct the pretensioner 74 to actuate in response to a far side oblique collision if the occupancy sensor 88 detects that the seat 12 is occupied.

In operation, the restraint 14 is in the undeployed position, as shown in FIGS. 1, 2A and 3A, under normal operating conditions of the vehicle 10. In the event of a far side oblique impact, the impact sensor 86 detects the impact. The impact sensor 86 transmits a signal indicating the far side oblique collision through the communications network 90 to the controller 84. At some point before the impact, the occupancy sensor 88 has transmitted a signal indicating whether or not the seat 12 is occupied through the communications network 90 to the controller 84. If the seat 12 is occupied and a far side oblique impact is detected, the controller 84 transmits a signal through the communications network 90 to the pretensioner 74. The pretensioner 74 actuates and pulls the cable 58. When the cable 58 is pulled, the second portion 64 of the cable 58 breaks through the tear seam 48, e.g., on the left bolster 42, and pulls the second side 70 of the panel 60 to the inflated position. Additionally, the end 80 of the sleeve 78 moves toward the pulley 76 and pulls the third side 72 of the panel 60 toward the pulley 76. The first portion 62 of the cable 58 and the first side of the panel 60 remain fixed to the seat 12, e.g., one of the seatback 16 and the seat bottom 18, during deployment. During the vehicle impact, e.g., the far side oblique impact, the occupant may move transverse to the seat-forward direction D1 away from the seatback 16. In this situation, the occupant may impact the restraint 14. The restraint 14 may catch the occupant to reduce movement by the occupant away from the seat 12, e.g., toward vehicle components. In other words, the restraint 14 may absorb energy from the occupant to retain the occupant on the seat 12, which may assist in reducing head inboard excursion of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
a seat bottom and a seatback;
a seatbelt buckle supported by the seat bottom;
a restraint deployable from the seatback to a deployed position and in the deployed position including a first edge extending along the seatback, a second edge extending along the seat bottom, and a third edge extending from the first edge to the second edge; and
the restraint disposed outboard of the seatbelt buckle relative to the seat bottom;
wherein the restraint includes a cable deployable from the seatback to the deployed position, the cable in the deployed position includes a first portion extending along and fixed to one of the seatback and the seat bottom and a second portion extending transverse to the seatback and the seat bottom.

2. The seat of claim 1, wherein one of the first edge and the second edge is fixed relative to one of the seatback and the seat bottom, respectively.

3. The seat of claim 1, wherein the restraint includes a panel extending along and fixed to the first portion and the second portion of the cable.

4. The seat of claim 3, wherein the panel extends along the other of the seatback and the seat bottom.

5. The seat of claim 1, further comprising a pulley rotatably supported by the other of the seatback and the seat bottom, the second portion of the cable extending around the pulley.

6. The seat of claim 5, further comprising a sleeve covering the second portion of the cable, the sleeve including an end disposed closer to the pulley in the deployed position than an undeployed position.

7. The seat of claim 1, wherein the first edge of the restraint, in a deployed position, is disposed partially inside the seatback, and the second edge of the restraint is disposed external to the seat bottom in an undeployed position.

8. A seat comprising:
a seat bottom and a seatback;
a restraint including a cable deployable from the seatback to a deployed position, the cable having a first portion extending along and fixed to one of the seatback and the seat bottom and a second portion extending from the first portion transverse to the seatback and the seat bottom;
the restraint including a panel extending along and fixed to the first and second portions; and
a seatbelt buckle supported by the seat bottom, the restraint is disposed outboard of the seatbelt buckle relative to the seat bottom.

9. The seat of claim 8, further comprising a pulley rotatably supported by the other of the seatback and the seat bottom, the second portion of the cable extending around the pulley.

10. The seat of claim 9, further comprising a sleeve covering the second portion of the cable, the sleeve including an end disposed closer to the pulley in the deployed position than an undeployed position.

11. The seat of claim 8, wherein the restraint includes a first edge extending along the seatback and a second edge extending along the seat bottom, the first edge is partially disposed inside the seatback, and the second edge is disposed external to the seat bottom in an undeployed position.

12. The seat of claim 8, wherein the panel extends along the other of the seatback and the seat bottom.

13. A seat comprising:
a seat bottom and a seatback;
a pulley rotatably supported by one of the seatback and the seat bottom;
a restraint including a cable engaged with the pulley, the restraint deployable from an undeployed position to a deployed position;
the restraint including a sleeve covering the cable and having an end, the end is disposed closer to the pulley in the deployed position than the undeployed position; and
a seatbelt buckle supported by the seat bottom, the restraint is disposed outboard of the seatbelt buckle relative to the seat bottom.

14. The seat of claim 13, wherein the cable, in the deployed position, includes a first portion extending along and fixed to one of the seatback and the seat bottom and a second portion extending transverse to the seatback and the seat bottom.

15. The seat of claim 14, wherein the restraint includes a panel extending along and fixed to the first portion and the second portion.

16. The seat of claim 15, wherein the panel extends along the other of the seatback and the seat bottom.

17. The seat of claim 13, wherein the restraint includes a first edge extending along the seatback and a second edge extending along the seat bottom, the first edge is partially disposed inside the seatback, and the second edge is disposed external to the seat bottom in the undeployed position.

* * * * *